US011264776B2

(12) United States Patent
Le Taillandier De Gabory et al.

(10) Patent No.: US 11,264,776 B2
(45) Date of Patent: Mar. 1, 2022

(54) OPTICAL AMPLIFIER, OPTICAL NETWORK INCLUDING THE SAME, AND METHOD FOR AMPLIFYING OPTICAL SIGNAL

(71) Applicant: NEC Corporation, Tokyo (JP)

(72) Inventors: Emmanuel Le Taillandier De Gabory, Tokyo (JP); Shigeru Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 637 days.

(21) Appl. No.: 16/095,175

(22) PCT Filed: Apr. 21, 2016

(86) PCT No.: PCT/JP2016/002132
§ 371 (c)(1),
(2) Date: Oct. 19, 2018

(87) PCT Pub. No.: WO2017/183061
PCT Pub. Date: Oct. 26, 2017

(65) Prior Publication Data
US 2019/0140418 A1 May 9, 2019

(51) Int. Cl.
*H01S 3/00* (2006.01)
*H01S 3/10* (2006.01)
(Continued)

(52) U.S. Cl.
CPC ...... *H01S 3/10015* (2013.01); *H01S 3/06737* (2013.01); *H01S 3/06754* (2013.01);
(Continued)

(58) Field of Classification Search
CPC .......... H01S 3/094011; H01S 3/09415; H01S 3/094069; H01S 3/06754; H01S 3/094007;
(Continued)

(56) References Cited

U.S. PATENT DOCUMENTS 8,988,768 B2   3/2015   Tokuhisa et al.
2008/0074731 A1  3/2008   Takeyama et al.
(Continued)

FOREIGN PATENT DOCUMENTS

JP   2004-015065 A   1/2004
JP   2010122548 A   6/2010
(Continued)

OTHER PUBLICATIONS

Extended European Search Report dated Mar. 25, 2019 issued by the European Patent Office in counterpart application No. 16899336.8.
(Continued)

*Primary Examiner* — Mark Hellner
(74) *Attorney, Agent, or Firm* — Sughrue Mion. PLLC

(57) ABSTRACT

In order to solve the problem that the power consumption of optical amplifiers is not optimized over the life time of a network whose capacity in use varies, an optical amplifier according to an exemplary aspect of the invention includes a gain medium for amplifying a plurality of optical channels, the gain medium including a plurality of cores through which the plurality of optical channels to propagate respectively and a cladding area surrounding the plurality of cores; monitoring means for monitoring the plurality of optical channels inputted into the gain medium and producing a monitoring result; a first light source configured to emit a first light beam to excite the cladding area; a second light source configured to emit a plurality of second light beams to excite each of the plurality of cores individually; and controlling means for making a decision as to whether each of the plurality of cores to transmit one of the plurality of optical channels based on the monitoring result, and controlling the first light source and the second light source based on the decision.

20 Claims, 8 Drawing Sheets

(51) Int. Cl.
- *H01S 3/067* (2006.01)
- *H01S 3/094* (2006.01)
- *H01S 3/0941* (2006.01)
- *H04B 10/294* (2013.01)
- *H04J 14/04* (2006.01)
- *H01S 3/13* (2006.01)

(52) U.S. Cl.
CPC ...... *H01S 3/06758* (2013.01); *H01S 3/09415* (2013.01); *H01S 3/094007* (2013.01); *H01S 3/094011* (2013.01); *H01S 3/094061* (2013.01); *H01S 3/094069* (2013.01); *H04B 10/294* (2013.01); *H04J 14/04* (2013.01); H01S 3/1001 (2019.08); H01S 3/13013 (2019.08)

(58) Field of Classification Search
CPC ........... H01S 3/06737; H01S 3/094061; H01S 3/10015; H01S 3/1001; H01S 3/13013; H04B 10/294; H04J 14/04
See application file for complete search history.

(56) References Cited

U.S. PATENT DOCUMENTS

| | | | |
|---|---|---|---|
| 2010/0129081 A1 | 5/2010 | Onaka | |
| 2013/0114130 A1* | 5/2013 | Stampoulidis | H01S 3/06737 359/341.32 |
| 2013/0302035 A1 | 11/2013 | Suzuki | |
| 2014/0036349 A1 | 2/2014 | Tokuhisa et al. | |
| 2015/0085352 A1 | 3/2015 | Ryf et al. | |

FOREIGN PATENT DOCUMENTS

| | | | |
|---|---|---|---|
| JP | 2013-123205 A | 6/2013 | |
| JP | 2013-187663 A | 9/2013 | |
| JP | 2014-038985 A | 2/2014 | |
| JP | 5416286 B2 | 2/2014 | |
| JP | 2014-099453 A | 5/2014 | |
| JP | 2014-236210 A | 12/2014 | |
| JP | 02014236210 A * | 12/2014 | ............... H01S 3/10 |
| JP | 2015-167158 A | 9/2015 | |
| JP | 5794237 B2 | 10/2015 | |

OTHER PUBLICATIONS

Communication dated Aug. 6, 2019, from the Japanese Patent Office in application No. 2018-549362.
Ono et al., "Study on gain control of MC-EDFA by using hybrid pumping of cladding- and core-direct-pumping schemes", The Institute of Electronics, Information and Communication Engineers, IEICE Technical Report OCS2014-116, Japan, 2014, OPE2014-222, Feb. 2015, pp. 111-115, vol. 144, No. 453.
International Search Report of PCT/JP2016/002132 dated Jul. 26, 2016 [PCT/ISA/210].
Written Opinion of PCT/JP2016/002132 dated Jul. 26, 2016 [PCT/ISA/237].
Communication dated Oct. 6, 2020 from the Japanese Patent Office in JP Application No. 2018-549362.

* cited by examiner

OPTICAL AMPLIFIER, OPTICAL NETWORK INCLUDING THE SAME, AND METHOD FOR AMPLIFYING OPTICAL SIGNAL

CROSS REFERENCE TO RELATED APPLICATIONS

This application is a National Stage of International Application No. PCT/JP2016/002132, filed Apr. 21, 2016.

TECHNICAL FIELD

The present invention relates to optical amplifiers, optical networks including the optical amplifiers, and methods for controlling an optical amplifier, in particular, to an optical amplifier, optical network including the optical amplifier, and a method for amplifying an optical signal using an optical fiber.

BACKGROUND ART

In order to optimize the investment in optical fiber links, it is desirable to increase the capacity of the optical fiber links. This can be achieved by increasing the spectral efficiency (SE) of the signals to be transmitted through the optical fiber links.

A common way to achieve the increase in the SE is to use more efficient modulation formats for the information to be transmitted. This can be used in conjunction with the wavelength division multiplexing (WDM) system.

Furthermore, the space division multiplexing (SDM) system is being used in order to increase the capacity of transmission through a single fiber maintaining the possibility of the transmission over a long distance.

The SDM system can be implemented with a multi-core fiber (MCF) and a multicore (MC)—erbium doped fiber amplifier (EDFA). The MCF includes several cores conducting optical signals within the same fiber. The MC-EDFA is a fiber amplifier with an MCF as a gain medium (see patent literature 1, for example). The MC-EDFA consists in pumping individually the cores of a single MCF gain medium with separate pumping lasers by a scheme of direct core pumping. The MC-EDFA system demonstrates the possibility to multiply the system capacity by the number of cores of the MCF. By using the MCF, it is possible to use the multiplicity of cores to spatially multiplex signals in addition to the WDM in each core and to increase the capacity to be transmitted through fibers without sacrificing the transmission distance.

Another advantage of the SDM is the benefit brought by the SDM amplifiers for power consumption of the transmission line and its node. An EDFA can be integrated with the MC-EDFA that brings benefits in power consumption from the implementation of a direct core pumping MC-EDFA. The reduction in power consumption at amplifiers is of primary importance for the system scalable to very high capacity and for the reduction in operation expenditure (OPEX) through the reduction in electricity consumed.

Another example of the SDM system is described in patent literature 1 (PTL1). A multi-core fiber amplifier described in PTL1 is a hybrid MC-EDFA scheme which combines cladding pumping for the benefits of low power and direct core pumping for individual control of the performance of the SDM channels.

The multi-core fiber amplifier described in PTL1 has at least two multi-core fiber amplification units arranged in series. Each multi-core fiber amplification unit has a multi-core fiber for amplification and an exciting light source. The multi-core fiber includes rare earth ions added to the cores. The exciting light source generates exciting light for exciting the rare earth ions.

At least one multi-core fiber for amplification in the multi-core fiber amplification unit has a core through which signal light inputted into the multi-core fiber amplification unit propagates, and a clad through which the exciting light propagates. The other multi-core fibers for amplification in the multi-core fiber amplification unit have multiplexing means for multiplexing the signal light and the exciting light, and inputting the multiplexed light into each of the cores in the other multi-core fibers for amplification. The exciting light power of the exciting light for the other multi-core fibers is adjusted on the basis of a calculation result of the signal light power of the signal light inputted into the multi-core fiber amplifier and the signal light power of signal light amplified and output by the multi-core fiber amplifier.

In the multi-core fiber amplifier described in PTL1, the pumping power for the cladding pumping is kept constant and the pumping power for the direct core pumping is adjusted to control the gain of the individual cores. This makes it possible to obtain almost constant gain over signal wavelengths even though the number of wavelengths included in WDM signals varies.

CITATION LIST

Patent Literature

[PTL 1]
Japanese Patent Application Laid-Open Publication No. 2015-167158

SUMMARY OF INVENTION

Technical Problem

Optical network systems using the SDM technologies for amplifiers with the MC-EDFA or for transmission with the MCF are not loaded at full capacity when they are introduced on the field. Typically, the capacity in use increases during the life time of the network to accommodate growing traffic demand. Networks are sized to the anticipated future traffic demand, not to the traffic at the time of their servicing. Therefore, between the introduction of the system and the time when the system has reached at full capacity, there is a long period of time, during which it will be used at intermediate capacity. Furthermore, some of the capacity can be saved for path recovery or to accommodate fluctuations in the capacity due to optical signal switching.

In this manner, some of the SDM channels in the system cannot be used, which leads to cores without signals in the MC-EDFA. In analogy with a dark fiber as which an unused fiber in the field is referred to, these unused cores can be referred to as dark cores. In contrast, the cores in use can be referred to as lightened cores.

In the case of the direct core pumping MC-EDFA, the individual pumping can save the power consumption for a period of time during which the capacity is low enough for there to be dark cores. However, when all cores are lightening, the direct core pumping is not optimized compared to the cladding pumping EDFA. The same argument is valid in an independent single core EDFA used in individual SDM channels.

On the other hand, the cladding pumping MC-EDFA leads to significant power reduction when the system is being used at full capacity. But the cladding pumping MC-EDFA is not efficient during the period of time during which the capacity is lower and some of the cores are dark because all cores are pumped in a batch manner.

In the same manner, the hybrid MC-EDFA described in PTL1 is not efficient during the period of time when some cores remain dark.

As mentioned above, there has been a problem that the power consumption of optical amplifiers is not optimized over the life time of a network whose capacity in use varies.

An exemplary object of the invention is to provide an optical amplifier, optical network including the optical amplifier, and a method for amplifying an optical signal, which solve the above-mentioned problem that the power consumption of optical amplifiers is not optimized over the life time of a network whose capacity in use varies.

Solution to Problem

An optical amplifier according to an exemplary aspect of the invention includes a gain medium for amplifying a plurality of optical channels, the gain medium including a plurality of cores through which the plurality of optical channels to propagate respectively and a cladding area surrounding the plurality of cores; monitoring means for monitoring the plurality of optical channels inputted into the gain medium and producing a monitoring result; a first light source configured to emit a first light beam to excite the cladding area; a second light source configured to emit a plurality of second light beams to excite each of the plurality of cores individually; and controlling means for making a decision as to whether each of the plurality of cores to transmit one of the plurality of optical channels based on the monitoring result, and controlling the first light source and the second light source based on the decision.

An optical network according to an exemplary aspect of the invention includes an optical amplifier; and network controlling means, the optical amplifier including a gain medium for amplifying a plurality of optical channels, the gain medium including a plurality of cores through which the plurality of optical channels to propagate respectively and a cladding area surrounding the plurality of cores; monitoring means for monitoring the plurality of optical channels inputted into the gain medium and producing a monitoring result; a first light source configured to emit a first light beam to excite the cladding area; a second light source configured to emit a plurality of second light beams to excite each of the plurality of cores individually; and controlling means for making a decision as to whether each of the plurality of cores to transmit one of the plurality of optical channels based on the monitoring result, and controlling the first light source and the second light source based on the decision, wherein the network controlling means controls wavelengths and spatial channels used for transmitting the optical channels, and the network controlling means allocates the wavelengths to a first spatial channel of the spatial channels, and other wavelengths to a second spatial channel of the spatial channels if no wavelength is available in the first spatial channel.

A method for amplifying an optical signal according to an exemplary aspect of the invention includes preparing a gain medium for amplifying a plurality of optical channels, the gain medium including a plurality of cores through which the plurality of optical channels to propagate respectively and a cladding area surrounding the plurality of cores; monitoring the plurality of optical channels inputted into the gain medium and producing a monitoring result; generating a first light beam to excite the cladding area; generating a plurality of second light beams to excite each of the plurality of cores individually; making a decision as to whether each of the plurality of cores to transmit one of the plurality of optical channels based on the monitoring result; and controlling optical power of the first light beam and the plurality of second light beams based on the decision.

Advantageous Effects of Invention

An exemplary advantage according to the present invention is that the power consumption of optical amplifiers reduces over the life time of a network in which the optical amplifiers are used.

DESCRIPTION OF EMBODIMENTS

Figure 1:
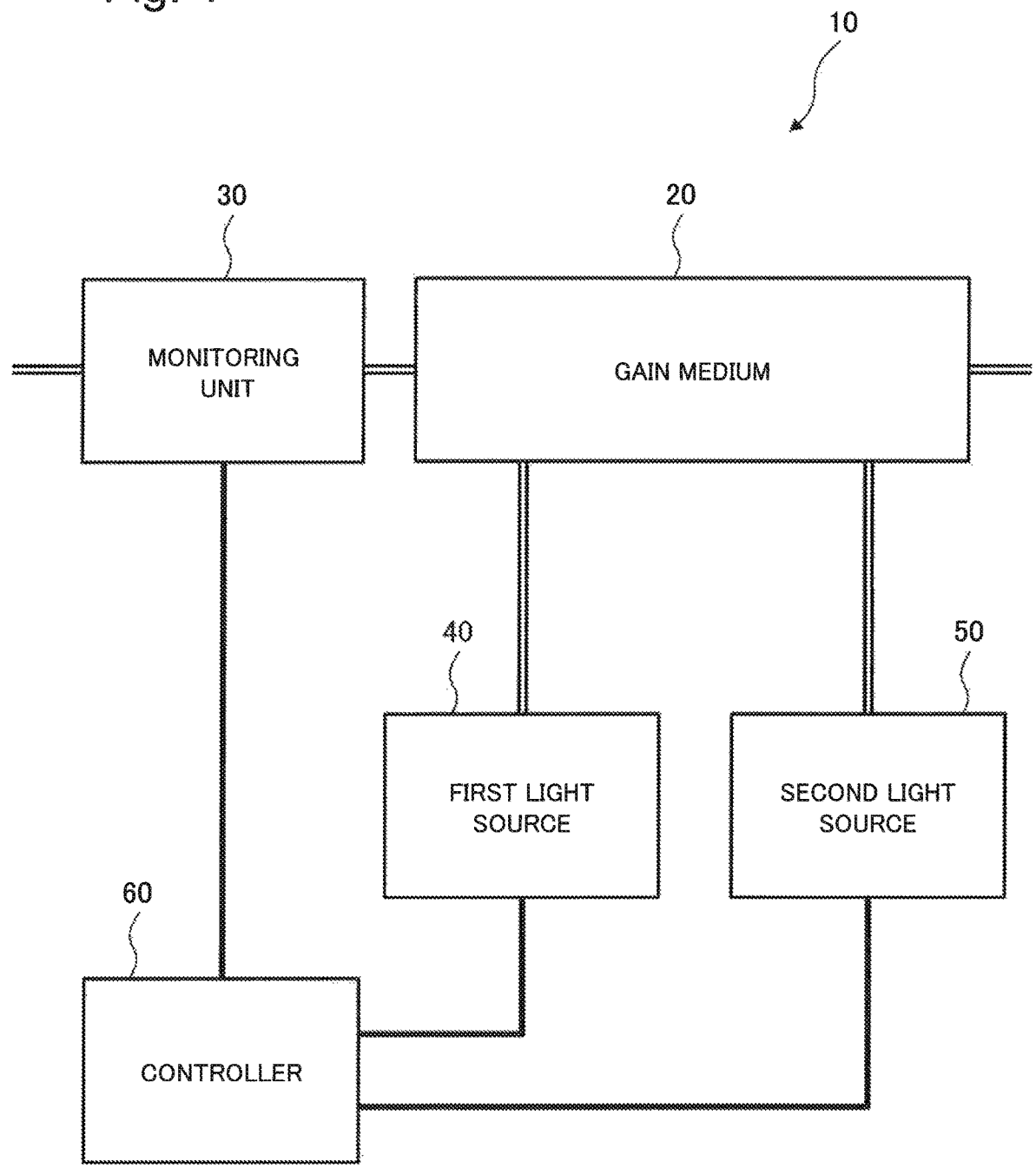
FIG. 1 is a block diagram illustrating the configuration of an optical amplifier in accordance with a first exemplary embodiment of the present invention.

The exemplary embodiments of the present invention will be described with reference to drawings below. The arrow direction in the drawings denotes an example of direction and does not limit the direction of signals between blocks.

A First Exemplary Embodiment

FIG. 1 is a block diagram illustrating the configuration of an optical amplifier in accordance with a first exemplary embodiment of the present invention. The optical amplifier 10 includes a gain medium 20, a monitoring unit (monitoring means) 30, a first light source 40, a second light source 50, and a controller (controlling means) 60.

The gain medium 20 amplifies a plurality of optical channels. The gain medium 20 includes a plurality of cores through which the plurality of optical channels propagate respectively and a cladding area surrounding the plurality of cores. The monitoring unit 30 monitors the plurality of optical channels inputted into the gain medium 20 and produces a monitoring result.

The first light source 40 is configured to emit a first light beam to excite the cladding area. The second light source 50 is configured to emit a plurality of second light beams to excite each of the plurality of cores individually.

The controller 60 makes a decision as to whether each of the plurality of cores to transmit one of the plurality of optical channels based on the monitoring result. And the controller 60 controls the first light source 40 and the second light source 50 based on the decision.

The above-mentioned configuration makes it possible to reduce the power consumption of optical amplifiers over the life time of a network in which the optical amplifiers are used.

Next, the operation of the optical amplifier in accordance with the present exemplary embodiment will be described.

The controller 60 may increase optical power of the first light beam if the number of the cores transmitting the optical channel becomes larger than a predetermined number. And the controller 60 may decrease optical power of the first light beam if the number of the cores transmitting the optical channel becomes smaller than a predetermined number.

The controller 60 may increase optical power of the first light beam if optical power of the plurality of second light beams decreases. And the controller 60 may decrease optical power of the first light beam if optical power of the plurality of second light beams increases.

The controller 60 may turn off optical power of one of the plurality of second light beams if a corresponding core does not transmit the optical channel. And the controller 60 may turn on optical power of one of the plurality of second light beams if a corresponding core transmits the optical channel.

The controller 60 may decrease optical power of one of the plurality of second light beams if the number of the cores transmitting the optical channel becomes larger than a predetermined number, and a corresponding core transmits the optical channel. And the controller 60 may increase optical power of one of the plurality of second light beams if the number of the cores transmitting the optical channel becomes smaller than a predetermined number, and a corresponding core transmits the optical channel.

The controller 60 may set optical power of the first light beam at one of a plurality of preset values. And the controller 60 may set optical power of the second light beam at one of a plurality of preset values.

Next, a method for amplifying an optical signal in accordance with the present exemplary embodiment will be described.

In the method for amplifying an optical signal, a gain medium for amplifying a plurality of optical channels is prepared. Here, the gain medium includes a plurality of cores through which the plurality of optical channels to propagate respectively and a cladding area surrounding the plurality of cores. The plurality of optical channels inputted into the gain medium are monitored, and a monitoring result is produced.

In addition, a first light beam is generated which excites the cladding area. A plurality of second light beams are also generated which excite each of the plurality of cores individually. A decision is made as to whether each of the plurality of cores to transmit one of the plurality of optical channels based on the monitoring result. Optical power of the first light beam and the plurality of second light beams are controlled based on the decision.

A Second Exemplary Embodiment

Next, a second exemplary embodiment of the present invention will be described.

Figure 2:
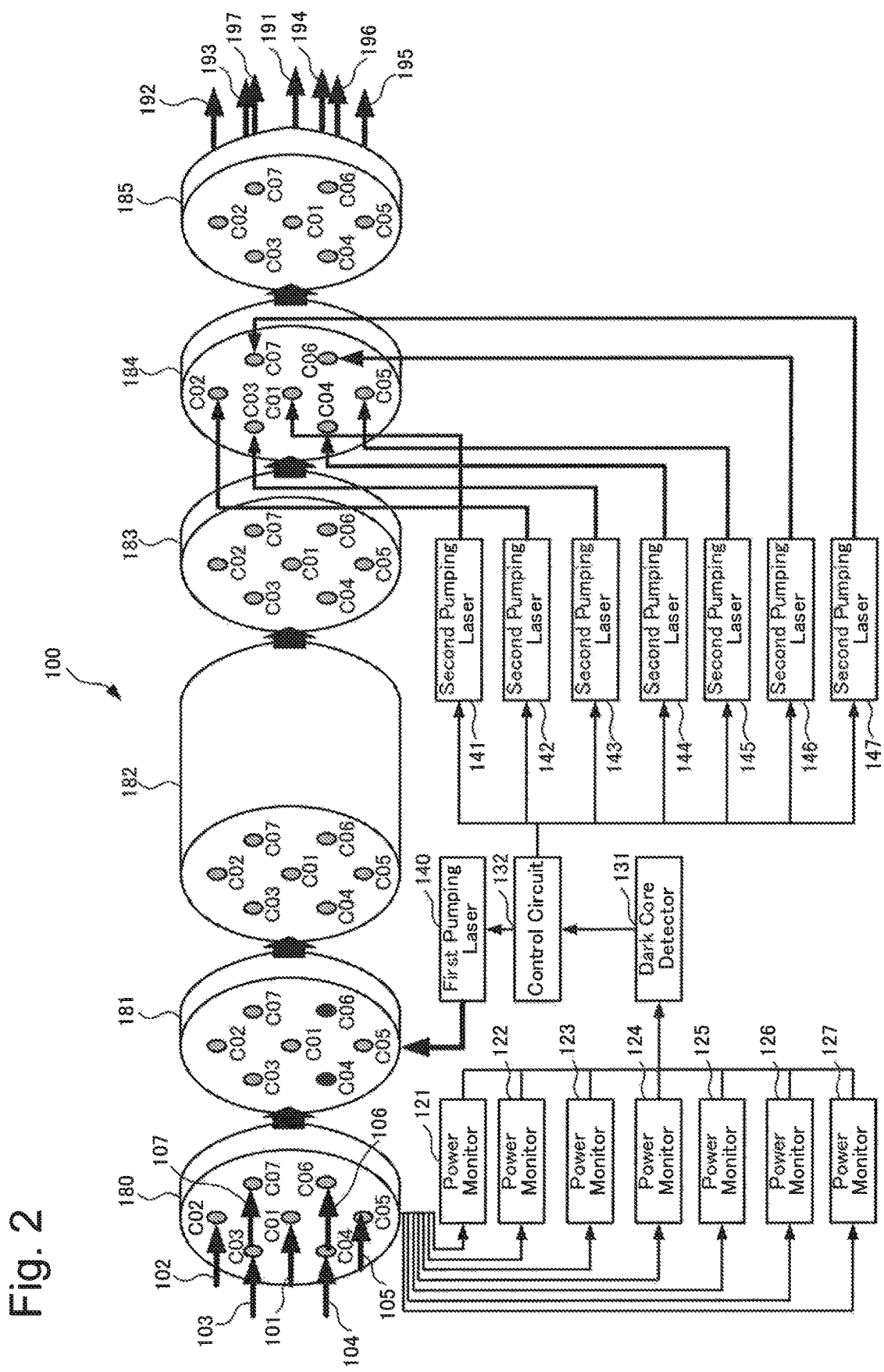
FIG. 2 is a schematic view illustrating the configuration of an optical amplifier in accordance with a second exemplary embodiment of the present invention.

FIG. 2 is a schematic representation of an optical amplifier 100 in accordance with a second exemplary embodiment of the present invention.

The optical amplifier 100 receives seven-input SDM (space division multiplexing) channels 101, 102, 103, 104, 105, 106, and 107, and amplifies them optically to output them respectively to seven-output SDM channels 191, 192, 193, 194, 195, 196, and 197. Each of the SDM channels may be made up of one or several multiplexed WDM (wavelength division multiplexing) optical signals. Each of the SDM channels can include no optical signal.

The optical amplifier 100 uses seven-core configuration. Each core is used for both input signals and output signals. The input signals can be provided for the optical amplifier 100 through a seven-core MCF (multi-core fiber). Identically, the output signals can be provided by the optical amplifier 100 for a seven-core MCF. The input and output seven-core MCF can be connected through connectors to the optical amplifier 100. Alternatively, the input and output seven-core MCF can be spliced to the optical amplifier 100.

The optical amplifier 100 includes a power tapping element 180, a first coupler 181, a gain medium 182, a pump stripper 183, a second coupler 184, and an isolator 185. The elements denoted with the numerals 180 to 185 accommodate the seven SDM channels.

The power tapping element 180 may include a seven-SDM channel isolator. The power tapping element 180 taps a part of each input power of the SDM channels denoted by C01, C02, C03, C04, C05, C06, and C07, and sends it to the respective power monitors 121, 122, 123, 124, 125, 126, and 127. The power monitors denoted by the numerals 121 to 127 may be integrated. They consist in optical to electrical (O/E) converter means. They can be implemented with low speed photodiodes, each of which outputs an output voltage proportional to the tapped portion of the input optical signal.

The output of the power tapping element 180 is provided for the first coupler 181. The first coupler 181 combines the seven-input SDM channels with a pumping light beam generated by a first pumping laser (first light source) 140. The first pumping laser 140 operates in a cladding pumping manner. The first pumping laser 140 can be a high power multimode laser diode with its wavelength of 980 nm.

The output of the first coupler 181 is provided for the gain medium 182. The gain medium 182 can be a seven-core MCF doped with erbium ions.

The seven cores of the MCF are denoted by the numerals of C01, C02, C03, C04, C05, C06, and C07.

The amplified signals pass through the pump stripper 183, which removes the remainder of the pumping light beam generated by the first pumping laser 140. The output of the pump stripper 183 is provided for the second coupler 184. The second coupler 184 combines the signals with the output of seven second pumping lasers (second light source) denoted by 141, 142, 143, 144, 145, 146, and 147, each of which directly pumps the respective cores C01, C02, C03, C04, C05, C06, and C07 of an MCF included in the gain medium 182. The second pumping lasers 141 to 147 may be single mode lasers with the wavelength of 1480 nm.

The output of the second coupler 184 passes through the isolator 185. The output signals denoted by 191 to 197 have been amplified through the MCF included in the gain medium 182 by the cladding pumping with the first pumping laser 140 and the direct core pumping with the second pumping lasers 141 to 147.

The outputs of the power monitors 121 to 127 are provided for a dark core detector 131. The dark core detector 131 compares each of the provided signals to a predetermined threshold voltage in order to determine whether each of the cores is a dark core. If there is no optical signal in the corresponding SDM channel, the voltage will be below the threshold, and the core will be considered as a dark core. If there is an optical signal in the corresponding SDM channel, the voltage will be above the threshold, and the corresponding core will be considered as a lightened core.

The dark core detector 131 outputs an electrical signal denoting the lightened cores and the dark cores to a control circuit 132. The control circuit 132 controls the individual optical outputs of the first pumping laser 140 for the cladding pumping and the second pumping lasers 141, 142, 143, 144, 145, 146, and 147 for the direct core pumping according to the signal provided by the dark core detector 131. The control circuit 132 controls the output of the first pumping laser and the second pumping lasers through tuning their respective operating intensities.

According to the control of the control circuit 132, the difference in the output level between lightened SDM channels is reduced, and the power consumption of the optical amplifier 100 is reduced efficiently, independently of the number of dark cores. Therefore, according to the optical amplifier 100 of the present exemplary embodiment, the power consumption of optical amplifiers reduces over the life time of a network in which the optical amplifiers are used.

A Third Exemplary Embodiment

Figure 3:
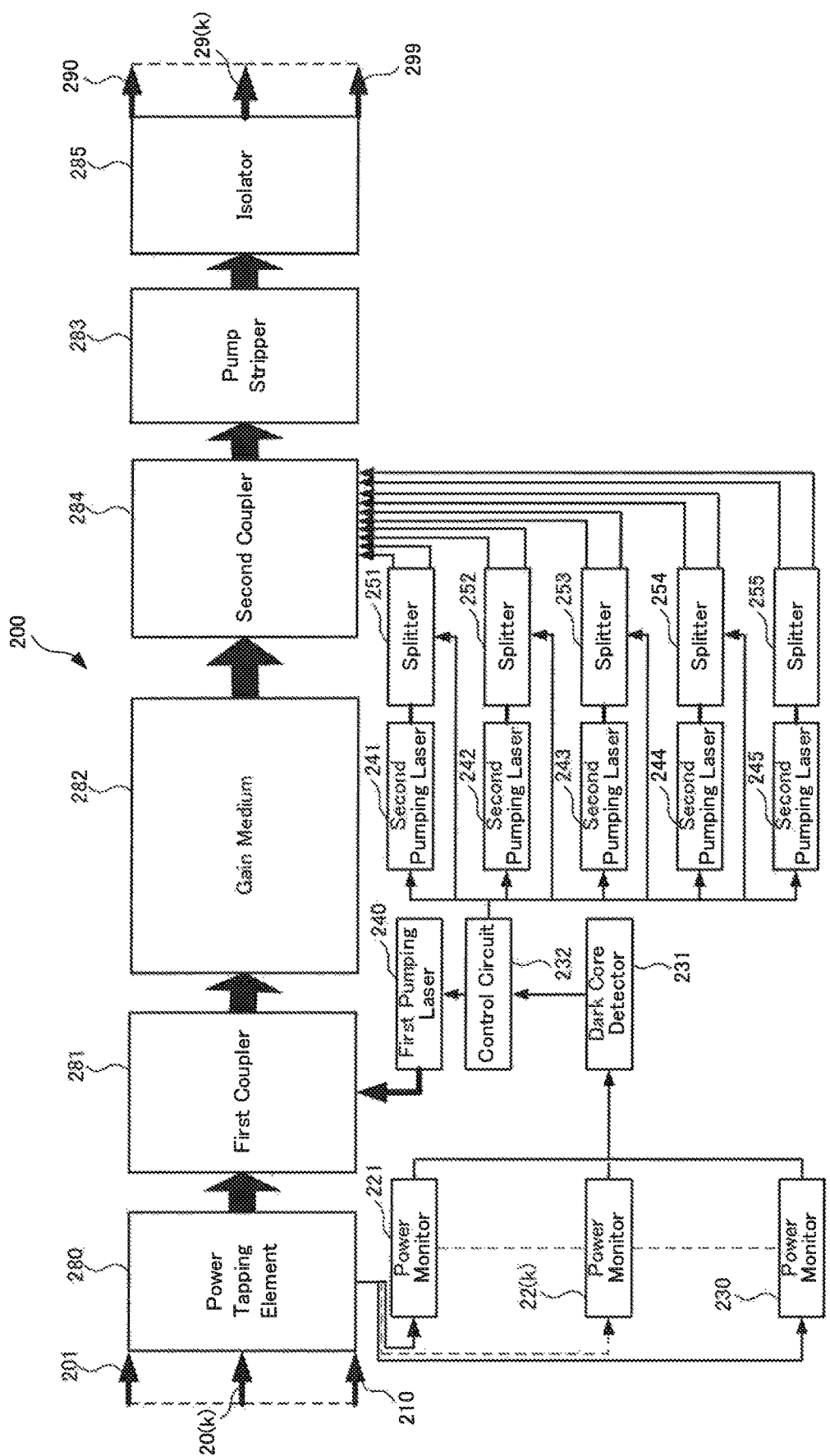
FIG. 3 is a block diagram illustrating the configuration of an optical amplifier in accordance with a third exemplary embodiment of the present invention.

Next, a third exemplary embodiment of the present invention will be described. FIG. 3 is a block diagram illustrating the configuration of an optical amplifier 200 according to the third exemplary embodiment of the present invention.

The optical amplifier 200 receives ten-input SDM channels 201 to 210 and amplifies them optically to output them respectively to ten-output SDM channels 290 to 299. The input channel 20(k) is amplified and output to the corresponding output channel 20(k−1), where k is a natural number. The input SDM channels 201 to 210 are identical to the input SDM channels 101 to 107. The input signals can be provided for the optical amplifier 200 through a ten-core MCF. Identically, the output signals can be provided for a ten-core MCF by the optical amplifier 200. The input and output ten-core MCF can be connected through connectors to the optical amplifier 200. Alternatively, the input and output ten-core MCF can be spliced to the optical amplifier 200.

The optical amplifier 200 includes a power tapping element 280, a first coupler 281, a gain medium 282, a pump stripper 283, a second coupler 284, and an isolator 285, whose functions are identical with those of the respective elements 180, 181, 182, 183, 184, and 185. The elements 280 to 285 accommodate the ten SDM channels.

The power tapping element 280 taps a part of the input power of the SDM channels and sends it to each of the ten power monitors 221 to 230. The k-th channel is monitored by the power monitor 22(k). The power monitors 221 to 230 are identical with the power monitors 121 to 127. The output of the power tapping element 280 is provided for the first coupler 281. The first coupler 281 combines the ten-input SDM channels with a pumping light beam generated by a first pumping laser 240. The first pumping laser 240 is identical with the first pumping laser 140 and operates in the cladding pumping manner.

The output of the first coupler 281 is provided for the gain medium 282, which includes a ten-core MCF doped with erbium ions. The gain medium 282 is used in the same manner as the gain medium 182. The amplified signals are provided for the second coupler 284. The second coupler 284 combines the amplified signals with the output of the ten outputs of splitters 251, 252, 253, 254, and 255.

The splitter is configured to split the output of second pumping laser (the second light beam) into a plurality of light beams. Each of the plurality of light beams excites each of the plurality of cores individually. The splitters can be realized by 3 dB couplers. Alternatively, the coupling ratio of the splitter can be tuned. The splitters split the outputs of second pumping lasers 241, 242, 243, 244, and 245, which are identical with the second pumping lasers 141 to 147. Each of the second pumping lasers 241 to 245 directly pumps two cores of a ten-core MCF included in the gain medium 282.

The output of the second coupler 284 passes through the pump stripper 283, which removes the remainder of the pumping light beam generated by the first pumping laser 240. The output of the pump stripper 283 passes through the isolator 285. The output signals denoted by 290 to 299 have been amplified through the MCF (gain medium 282) by the cladding pumping with the first pumping laser 240 and the direct core pumping with the second pumping lasers 241 to 245.

The outputs of the power monitors 221 to 230 are provided for a dark core detector 231, which is identical with the dark core detector 131. The dark core detector 231 determines whether each of the ten SDM channels of the optical amplifier 200 is dark. The dark core detector 231 outputs an electrical signal denoting the lightened cores and the dark cores to a control circuit 232. The control circuit 232 is identical with the control circuit 132. The control circuit 232 controls the individual optical outputs of the first pumping laser 240 for the cladding pumping and the second pumping lasers 241 to 245 for the direct core pumping according to the signal provided by the dark core detector 231.

According to the control of the control circuit 232, the difference in the output level between lightened SDM channels is reduced, and the power consumption of the optical amplifier 200 is reduced efficiently, independently of the number of dark cores. Therefore, according to the optical amplifier 200 of the present exemplary embodiment, the power consumption of optical amplifiers reduces over the life time of a network in which the optical amplifiers are used.

In an alternative implementation, each of the splitters 251 to 255 has a variable splitting ratio in order to improve the precision of the output power and the reduction of the difference between cores. The splitting ratios can be tuned by the control circuit 232. This improves the quality of the transmission lines using the optical amplifier 200.

In the alternative implementation, the splitters 251 to 255 can be tuned in order to change the splitting ratio among cores when a new core is lightened. For instance, the output of the splitter 251 pumps the cores C01 and C02 of the MCF included in the gain medium 282. First, only the core C01 is lightened and the core C02 is dark. When the core C02 is lightened, the splitting ratio of the splitter 251 is tuned by the control circuit 232 in order to share the output of the second pumping laser 241 between the core C01 and the core C02. This contributes to reducing the power consumption when the number of the lightened cores varies.

A Fourth Exemplary Embodiment

Figure 4:
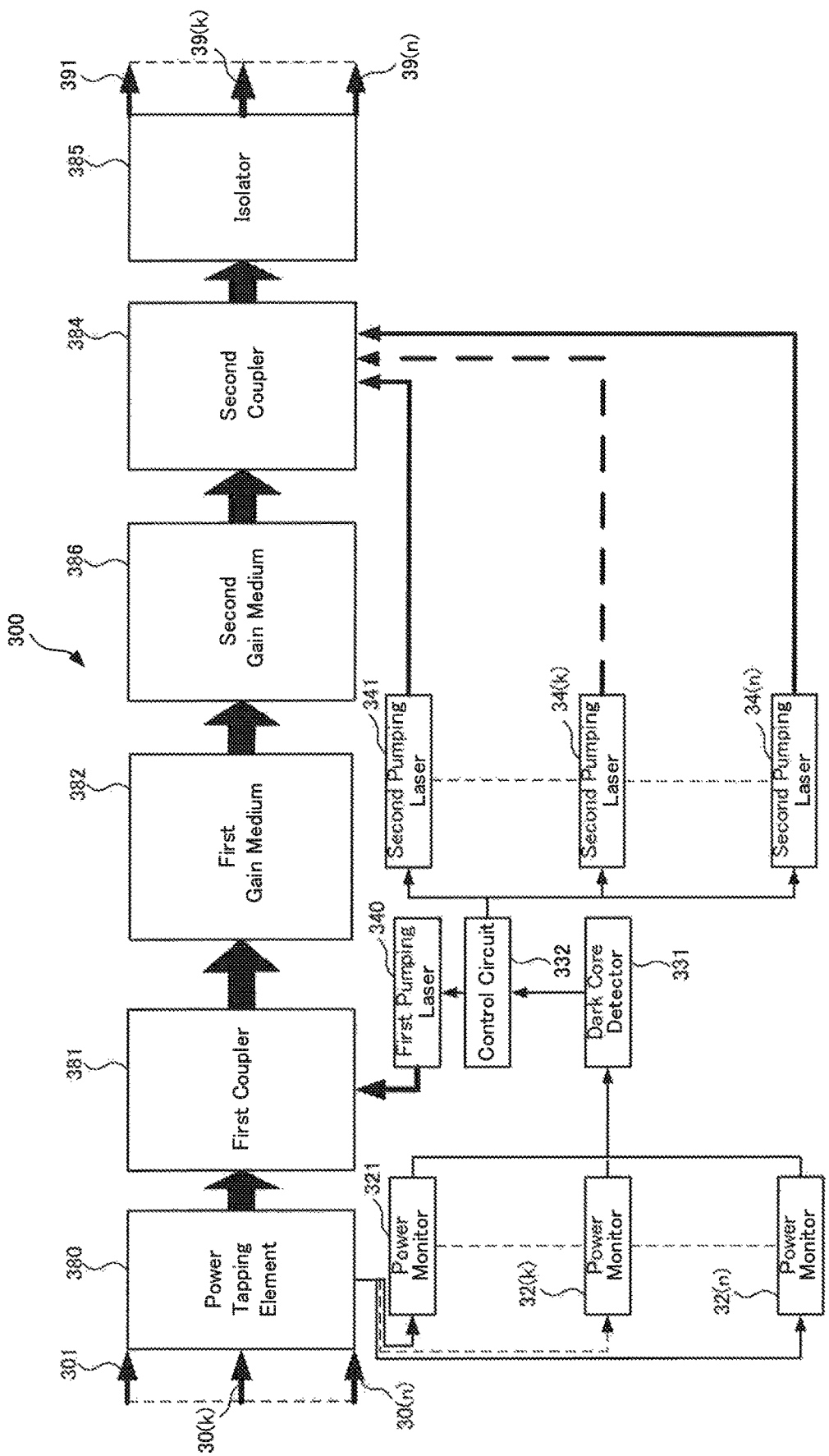
FIG. 4 is a block diagram illustrating the configuration of an optical amplifier in accordance with a fourth exemplary embodiment of the present invention.

Next, a fourth exemplary embodiment of the present invention will be described. FIG. 4 is a block diagram illustrating the configuration of an optical amplifier 300 according to the fourth exemplary embodiment of the present invention.

The optical amplifier 300 receives n-tuple input SDM channels 301 to 30(*n*) and amplifies them optically to output them to the n-tuple output SDM channels 391 to 39(*n*) respectively. The input SDM channels 301 to 30(*n*) are identical to the input SDM channels 101 to 107. The input signals can be provided for the optical amplifier 300 through an n-tuple core MCF. Identically, the output signals can be provided for an n-tuple core MCF by the optical amplifier 300. Alternatively, the n-tuple SDM channels may be provided for several MCFs each of which has cores with the number of the cores less than n. The input and output of the n-tuple core MCF can be connected through connectors to the optical amplifier 300. Alternatively, the input and output n-tuple core MCF can be spliced to the optical amplifier 300.

The optical amplifier 300 includes a power tapping element 380, a first coupler 381, a first gain medium 382, a second gain medium 386, a second coupler 384, and an isolator 385, whose functions are identical with those of the respective elements 180, 181, 182, 182, 184, and 185. Pump strippers may be integrated in the first gain mediums 382 or the second gain medium 386. The elements denoted by the numerals 380 to 386 accommodate the n-tuple SDM channels.

The power tapping element 380 taps a part of each input power of the SDM channels and sends it to each of the n-tuple power monitors 321 to 32(*n*). The power monitors 321 to 32(*n*) are identical with the power monitors 121 to 127. The output of the power tapping element 380 is provided for the first coupler 381. The first coupler 381 combines the n-tuple input SDM channels with a pumping light beam generated by a first pumping laser 340. The first pumping laser 340 is identical with the first pumping laser 140 and operates in the cladding pumping manner. Alternatively, the first pumping laser 340 may include several laser diodes, whose outputs are combined, and operates also in the cladding pumping manner.

The output of the first coupler 381 is provided for the first gain medium 382, which includes an n-core MCF doped with erbium ions. The first gain medium 382 is pumped in the cladding pumping manner by the first pumping laser 340. The output of the first gain medium 382 is provided for a second gain medium 386, which includes an n-core MCF doped with erbium ions. The second gain medium 386 is pumped in the direct core pumping manner by n-tuple second pumping lasers 341 to 34(*n*).

The amplified signals are provided for the second coupler 384. The second coupler 384 combines them with the n-tuple outputs of the second pumping lasers 341 to 34(*n*), which are identical with the second pumping lasers 141 to 147. Each of the second pumping lasers 341 to 34(*n*) directly pumps one of the n-cores of an MCF included in the second gain medium 386.

The output of the second coupler 384 passes through the isolator 385. The output SDM channels denoted by 391 to 39(*n*) have been amplified through the MCF included in the first gain medium 382 by the cladding pumping with the first pumping laser 340 and the MCF included in the second gain medium 386 by the direct core pumping with the second pumping lasers 341 to 34(*n*).

The outputs of the power monitors 321 to 32(*n*) are provided for a dark core detector 331, which is identical with the dark core detector 131. The dark core detector 331 determines whether each of the n-tuple SDM channels of the optical amplifier 300 is dark. The dark core detector 331 outputs an electrical signal denoting the lightened cores and the dark cores to a control circuit 332, which is identical with the control circuit 132.

The control circuit 332 controls the individual optical outputs of the first pumping laser 340 for the cladding pumping and the second pumping lasers 341 to 34(*n*) for the direct core pumping according to the signal provided by the dark core detector 331.

According to the control of the control circuit 332, the difference in the output level between lightened SDM channels is reduced, and the power consumption of the optical amplifier 300 is reduced efficiently, independently of the number of dark cores. Therefore, according to the optical amplifier 300 of the present exemplary embodiment, the power consumption of optical amplifiers reduces over the life time of a network in which the optical amplifiers are used.

A Fifth Exemplary Embodiment

Figure 5:
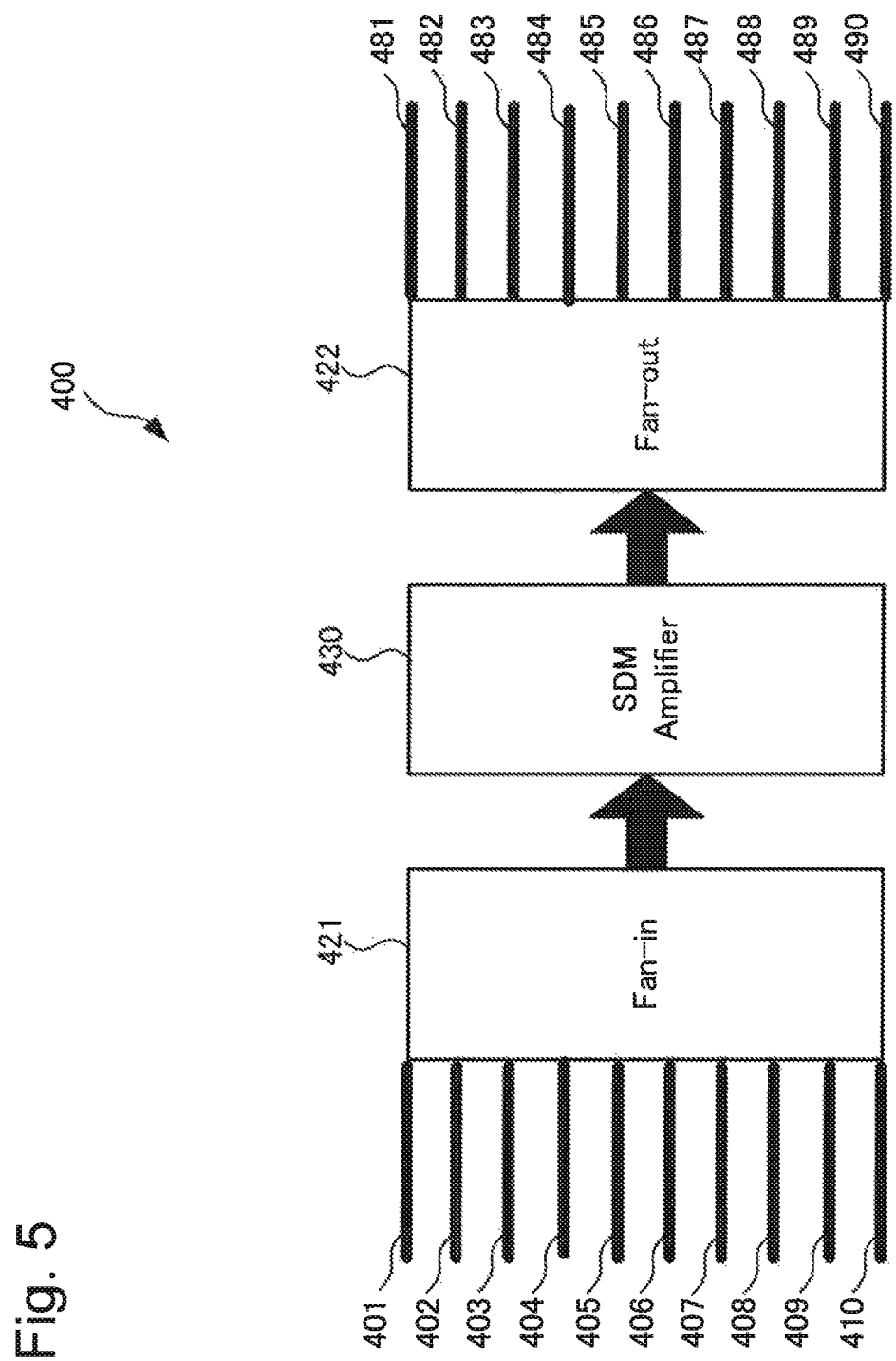
FIG. 5 is a block diagram illustrating the configuration of an optical amplifier device in accordance with a fifth exemplary embodiment of the present invention.

Next, a fifth exemplary embodiment of the present invention will be described. FIG. 5 is a block diagram illustrating the configuration of an optical amplifier device 400 according to the fifth exemplary embodiment of the present invention.

The optical amplifier device 400 includes a fan-in 421, a SDM amplifier 430, and a fan-out 422. The fan-in 421 is used as a SDM multiplexer. The fan-in 421 multiplexes the outputs of ten single core fibers 401, 402, 403, 404, 405, 406, 407, 408, 409, and 410 into ten SDM channels. The ten SDM channels are amplified by the SDM amplifier 430, which can be similar to the optical amplifiers 100, 200, or 300 including ten SDM channels.

The output of the SDM amplifier 430 is de-multiplexed by the fan-out 422 into ten single core fibers 481, 482, 483, 484, 485, 486, 487, 488, 489, and 490. The single core fibers denoted by the numerals 401 to 410 and 481 to 490 can be standard single mode fibers.

According to the optical amplifier device 400, the difference in the output level between lightened SDM channels is reduced, and the power consumption of the optical amplifier device 400 is reduced efficiently, independently of the number of the single core fibers as dark cores. Therefore, according to the optical amplifier device 400 of the present exemplary embodiment, the power consumption of the optical amplifier device reduces over the life time of a network in which the optical amplifier device is used.

A Sixth Exemplary Embodiment

Next, a sixth exemplary embodiment of the present invention will be described. In the sixth exemplary embodiment, the simulations results of the optical amplifiers in accordance with the second exemplary embodiment and the third exemplary embodiment.

Figure 6A:
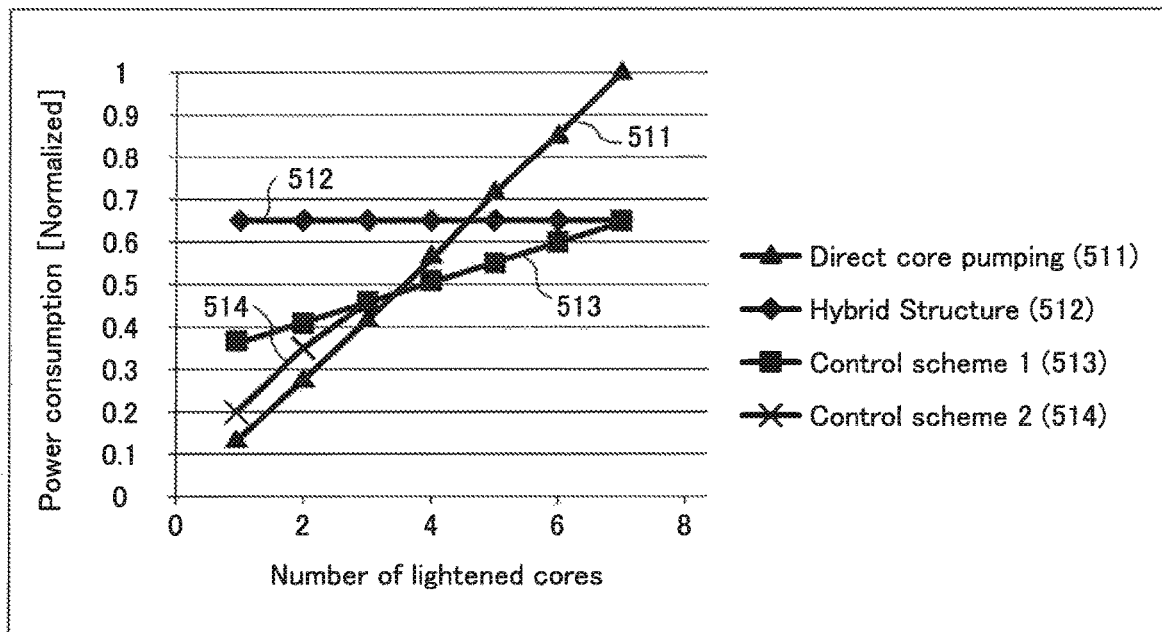
FIG. 6A is a diagram illustrating simulations results of the power consumption of the optical amplifier in accordance with the second exemplary embodiment of the present invention.

FIG. 6A represents the power consumption of the optical amplifier 100 illustrated in FIG. 2. The power consumption is plotted against the number of lightened cores, that is, the number of cores through which optical signal propagates.

The curve 513 represents the simulation results of the power consumption of the optical amplifier 100 according to a first control scheme which will be described in detail below. The curve 514 represents the simulation results of the power consumption of the optical amplifier 100 according to a second control scheme which will be described in detail below.

For illustrating exemplary benefits of the present invention, the curve 511 represents the simulation results of the power consumption of an optical amplifier using the direct core pumping as disclosed in PTL1 in the same conditions as those of the curve 513. Identically, the curve 512 represents the simulation results of the power consumption of an optical amplifier using the hybrid pumping as disclosed in PTL1 in the same conditions as those of the curve 513.

Figure 6B:
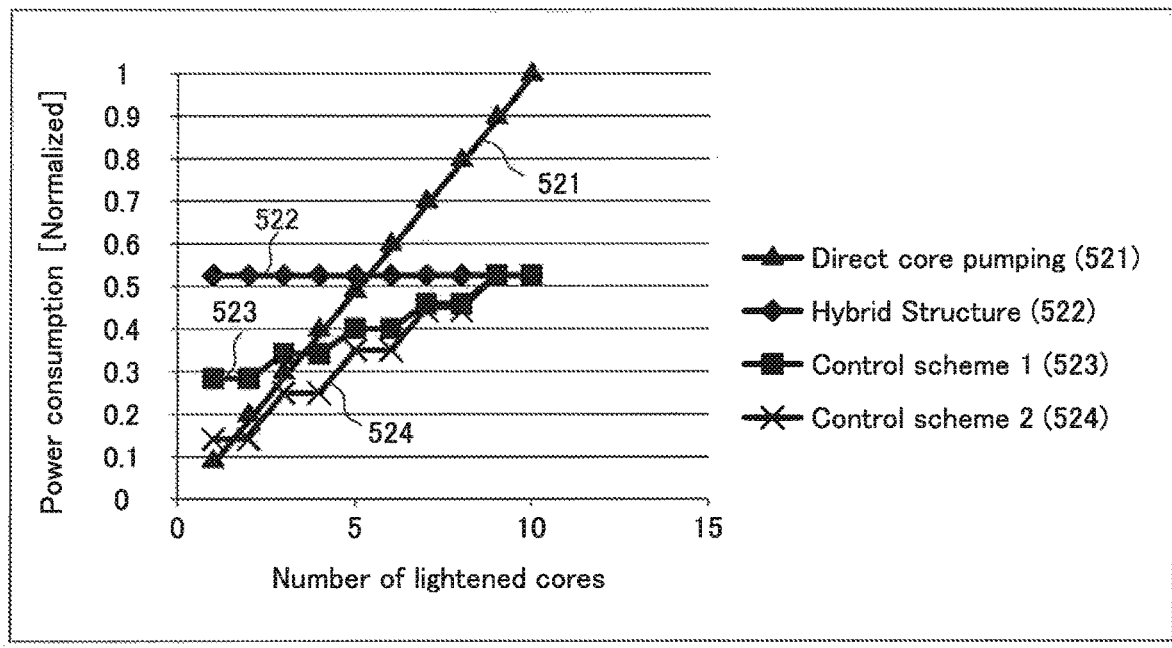
FIG. 6B is a diagram illustrating simulations results of the power consumption of the optical amplifier in accordance with the third exemplary embodiment of the present invention.

FIG. 6B represents the power consumption of the optical amplifier 200 illustrated in FIG. 3. The power consumption is plotted against the number of lightened cores, that is, the number of cores through which optical signal propagates.

The curve 523 represents the simulation results of the power consumption of the optical amplifier 200 according to the first control scheme. The curve 524 represents the simulation results of the power consumption of the optical amplifier 200 according to the second control scheme.

For illustrating exemplary benefits of the present invention, the curve 521 represents the simulation results of the power consumption of an optical amplifier using the direct core pumping as disclosed in PTL1 in the same conditions as those of the curve 523. Identically, the curve 522 represents the simulation results of the power consumption of an optical amplifier using the hybrid pumping as disclosed in PTL1 in the same conditions as those of the curve 523.

Now, an example of the operation of the optical amplifier 100 illustrated in FIG. 2 is given, and the exemplary benefits of the operation are illustrated in FIG. 6A. Considering the first control scheme, the control circuit 132 has two possible setting target values for the operating intensities of each of the pumping lasers 140, 141, 142, 143, 144, 145, 146, and 147. The output power of the pumping laser is set through the operating intensities. In the second pumping lasers 141 to 147 for the direct core pumping, the first setting value is set below the lasing threshold. The second operation target value is set for the full stable operation in the hybrid amplification mode. For instance, the first setting value can be set to zero. The two values for the first pumping laser 140 are set to a degenerate value.

The dark core detector 131 detects the optical power of each SDM channel and compares it with the preset threshold in order to determine whether the corresponding core is a dark core, that is, without any optical signal, or a lightened core, that is, with at least one optical signal. The dark core detector 131 passes through the information on the core state for each core to the control circuit 132.

The control circuit 132 keeps the first pumping laser 140 constant. Furthermore, for dark cores, the control circuit 132 sets the corresponding direct core pumping laser to the first setting value. For lightened cores, the control circuit 132 sets the corresponding direct core pumping laser to the second setting value. The resulting power consumption is plotted with the curve 513. Up to three cores, the plot of curve 511 for the simple direct core pumping amplifier has the lowest power consumption. However, at five cores or more, it has the highest power consumption. This makes it unviable solutions at the maximum system capacity. In comparison, the plot of curve 512 for the hybrid structure enables the power reduction compared to the plot 511 for using five cores or more.

On the other hand, the plot of the curve 513 for the control scheme according to the present exemplary embodiment has a maximum power consumption equal to the one of curve 512 at seven lightened cores. But the control scheme enables the power reduction with six or less lightened cores and enables the reduction of the power consumption up to 43% compared to the curve 512. Moreover, with seven or less lightened cores, it enables the reduction of the power consumption up to 35% compared to the curve 511.

Therefore, according to the exemplary embodiments of the present invention, effective power reduction can be achieved independently of the number of in-use SDM channels. Furthermore, it is possible to reduce the difference in the output between lightened SDM channels by virtue of controlling pumping lasers for cores independently.

Now, the second control scheme is considered. In the second control scheme, the control circuit 132 has a plurality of distinct possible setting target values for the operating intensities of each of the pumping lasers 140, 141, 142, 143, 144, 145, 146, and 147. The output power of the pumping lasers is set through the operating intensities. For each of the second pumping lasers 141 to 147, three values are selected. The first setting value is set below the lasing threshold. The second and third operation target values are set above the lasing threshold and are strictly distinct. The second value is set for the full stable operation in the hybrid amplification mode.

For instance, the first setting value can be set to zero. For the first pumping laser 140, two distinct values are set, and the second value is set for the full stable operation in the hybrid amplification mode. The combination of the highest setting value for the direct core pumping and the lowest setting value for the cladding pumping, and the combination of the medium setting value for the direct core pumping and the highest setting value for the cladding pumping, produce the same optical amplification gain for the corresponding core.

The dark core detector 131 detects the optical power for each SDM channel and compares it with the preset threshold in order to determine whether the corresponding core is a dark core, that is, without any optical signal, or a lightened core, that is, with at least one optical signal. The dark core detector 131 passes through the information on the core state for each core to the control circuit 132.

The control circuit 132 controls the operating values of the pumping lasers 140 to 147 according to the preset values.

For one lightened core or two lightened cores, the first pumping laser 140 is set to the lowest preset value. The second pumping lasers 141 to 147 are set to the highest value for corresponding lightened cores and to the lowest value for dark cores.

For three or more lightened cores, the first pumping laser 140 is set to the highest preset value. The second pumping lasers 141 to 147 are set to the median value for corresponding lightened cores and to the lowest value for dark cores.

The resulting power consumption is plotted with the curve 514. For one lightened core and two lightened cores, the second control scheme provides even more reduction of the power consumption compared to the first control scheme with additional memory costs to store preset values and one additional threshold for total number of lightened cores.

Therefore, according to the present exemplary embodiments of the present invention, effective power reduction can be achieved independently of the number of in-use SDM channels. Furthermore, it is possible to reduce the difference in the output between lightened SDM channels by virtue of controlling pumping lasers for cores independently.

In an alternative implementation, three values for each of the second pumping lasers 141 to 147 are set. The amplifier gain is considered as follows.

$$G_{total} = G_{cladding}(i) \times (1 + G_{direct}(i)) \quad (1)$$

where $$G_{cladding}(i) = n_{cladding}(i) \times P_{cladding} \quad (2)$$

$G_{cladding}(i)$ is the gain of the core denoted by the numeral i with the cladding pumping expressed as the product of the efficiency $n_{cladding}(i)$ for the core i and the power $P_{cladding}$ of the first pumping laser 140.

The power $P_{cladding}$ is expressed as follows.

$$P_{cladding} = \rho_{cladding} \times (I_{op,cladding} - I_{th,cladding}), \forall I_{op,cladding} \geq I_{th,cladding} \quad (3)$$

The power $P_{cladding}$ is expressed as the product of the efficiency $\rho_{cladding}$ of the first pumping laser 140 and the difference between the operating intensity $I_{op,\,cladding}$ and the threshold intensity $I_{th,\,cladding}$ of the laser. The efficiency $\rho_{cladding}$ depends on the operating intensity of the laser $I_{op,\,cladding}$.

Identically, the gain of the core denoted by i with the direct core pumping $G_{direct}(i)$ is expressed as follows.

$$G_{direct}(i) = n_{direct}(i) \times P_{direct} \quad (4)$$

where $n_{direct}(i)$ is the efficiency for the core i and $P_{direct}(i)$ is the power of the direct core pumping for core i. $P_{direct}(i)$ is expressed as follows.

$$P_{direct}(i) = \rho_{direct}(i) \times (I_{op,direct}(i) - I_{th,direct}(i)), \forall I_{op,direct}(i) \geq I_{th,direct}(i) \quad (5)$$

$P_{direct}(i)$ is expressed as the product of the efficiency of the pump $\rho_{direct}(i)$ denoted by the numeral equal to 140+i and the difference between the operating intensity $I_{op,\,direct}(i)$ and the threshold intensity $I_{th,\,direct}(i)$ of the laser. The efficiency $\rho_{direct}(i)$ depends on the operating intensity of the laser $I_{op,\,direct}(i)$.

The first value for the operating current of the second pumping lasers 141 to 147 is set at $I_{op,\,direct,\,1}(i) = 0$. The second value of the operating current $I_{op,\,direct,\,2}(i)$ is fixed to the stable value in the hybrid mode for full load of the amplifier and is expressed as follows.

$$I_{op,direct,2}(i) = \text{Max}\left[0, I_{th,direct}(i) + \frac{\frac{G_{total}}{G_{cladding,2}(i)} - 1}{n_{direct}(i) \times \rho_{direct}(i)}\right] \quad (6)$$

$G_{cladding,\,2}$ is chosen as follows.

$$\text{Max}_{i \leq 7}(G_{cladding,2}(i)) = G_{cladding,2}(i_{max,cladding}) = G_{total} \quad (7)$$

The third value of the operating current of the second pumping lasers 141 to 147 is set as follows.

$$I_{op,direct,3}(i) = \text{Max}\left[0, I_{th,direct}(i) + \frac{\frac{G_{total}}{G_{cladding,1}(i)} - 1}{n_{direct}(i) \times \rho_{direct}(i)}\right] \quad (8)$$

$G_{cladding,\,1}$ is chosen for index $i_{min,\,direct}$ as follows.

$$G_{total} = G_{cladding,1}(i_{min,direct}) \times (1 + n_{direct}(i_{min,direct}) \times \rho_{direct}(i_{min,direct}) \times (I_{op,direct}(i_{min,direct}) - I_{th,direct}(i_{min,direct}))) \quad (9)$$

Here, $I_{op,\,direct}(i_{min,\,direct})$ is reaching the maximum allowed operating current. Accordingly, for the first pumping laser 140, the two preset values are chosen as follows.

$$I_{op,cladding,1}(i) = I_{th,cladding}(i) + \frac{G_{cladding,1}(i)}{n_{cladding}(i) \times \rho_{cladding}(i)} \quad (10)$$

$$I_{op,cladding,2}(i) = I_{th,cladding}(i) + \frac{G_{cladding,2}(i)}{n_{cladding}(i) \times \rho_{cladding}(i)} \quad (11)$$

In an alternative implementation, the first value of the operating current for the second pumping lasers 141 to 147 are set at 0. The second value of the operating current is fixed to the stable value in the hybrid mode for full load of the amplifier. The third value for the operating current is chosen which is higher than the second value and is adjusted to keep the gain constant for all lightened cores. The two values for the first pumping laser 140 are chosen to keep the gain constant for the lightened cores when the related second pumping lasers 141 to 147 are set to the second value or the third value.

In an alternative implementation, an automatic power control or an automatic gain control for the optical amplifier 100 can also be used in the exemplary embodiments of the present invention. In this manner, the laser diodes are set to their preset values, and additional control modes are applied after the first setting. Here, the first set values are determined according to the exemplary embodiments of the present invention.

Another example of the operation according to the present exemplary embodiment is given for the optical amplifier 200 illustrated in FIG. 3. The exemplary benefits of the operation are illustrated in FIG. 6B. The first control scheme is considered which is identical with the control scheme for curve 513 illustrated in FIG. 6A.

The control circuit 232 keeps the first pumping laser 240 constant. Furthermore, for dark cores, the control circuit 232 sets the corresponding second pumping lasers 241 to 245 for the direct core pumping to the first setting value. For lightened cores, the control circuit 232 sets the corresponding second pumping lasers 241 to 245 for the direct core pumping to the second setting value. If only one of the two cores pumped by the laser is lightened, the laser is set to the value set for lightened cores.

The resulting power consumption is plotted with the curve 523. Up to three cores, the simple direct core pumping amplifier plotted with curve 521 has the lowest power consumption. However, at five cores or more, it has the highest power consumption. This makes it unviable solutions at the maximum system capacity. In comparison, the plot of the curve 522 for the hybrid structure enables the power reduction compared to the plot 521 for using more than five cores.

On the other hand, the plot of the curve 523 for the control scheme according to the present exemplary embodiment has a maximum power consumption equal to the one of the curve 522 at nine or more lightened cores. But the control scheme enables the power reduction with eight or less lightened cores and enables the reduction of the power consumption up to 45% compared to the curve 522. Moreover, with ten or less lightened cores, it enables the reduction of the power consumption up to 49% compared to the curve 521.

Therefore, according to the exemplary embodiments of the present invention, effective power reduction can be achieved independently of the number of in-use SDM channels. Furthermore, it is possible to reduce the difference in the output between lightened SDM channels by virtue of controlling pumping lasers for cores independently.

Now, the second control scheme is considered which is identical with the control scheme for the curve 514 illustrated in FIG. 6A.

For up to eight lightened cores, the first pumping laser 240 is set to the lowest preset value, and the second pumping lasers 241 to 245 are set to the highest value for corresponding lightened cores and to the lowest value for dark cores. If only one of the two cores directly pumped by the corresponding laser, the laser is set to the highest preset value.

For nine and ten cores, the first pumping laser 240 is set to the highest preset value, and the second pumping lasers 241 to 245 are set to the median value.

The resulting power consumption is plotted with the curve 524. For up to eight lightened cores, the second control scheme provides even more reduction of the power consumption compared to the first control scheme with additional memory costs to store preset values and one additional threshold for total number of lightened cores.

Therefore, according to the exemplary embodiments of the present invention, effective power reduction can be achieved independently of the number of in-use SDM channels. Furthermore, it is possible to reduce the difference in the output between lightened SDM channels by virtue of controlling pumping lasers for cores independently.

A Seventh Exemplary Embodiment

Next, a seventh exemplary embodiment of the present invention will be described.

Figure 7:
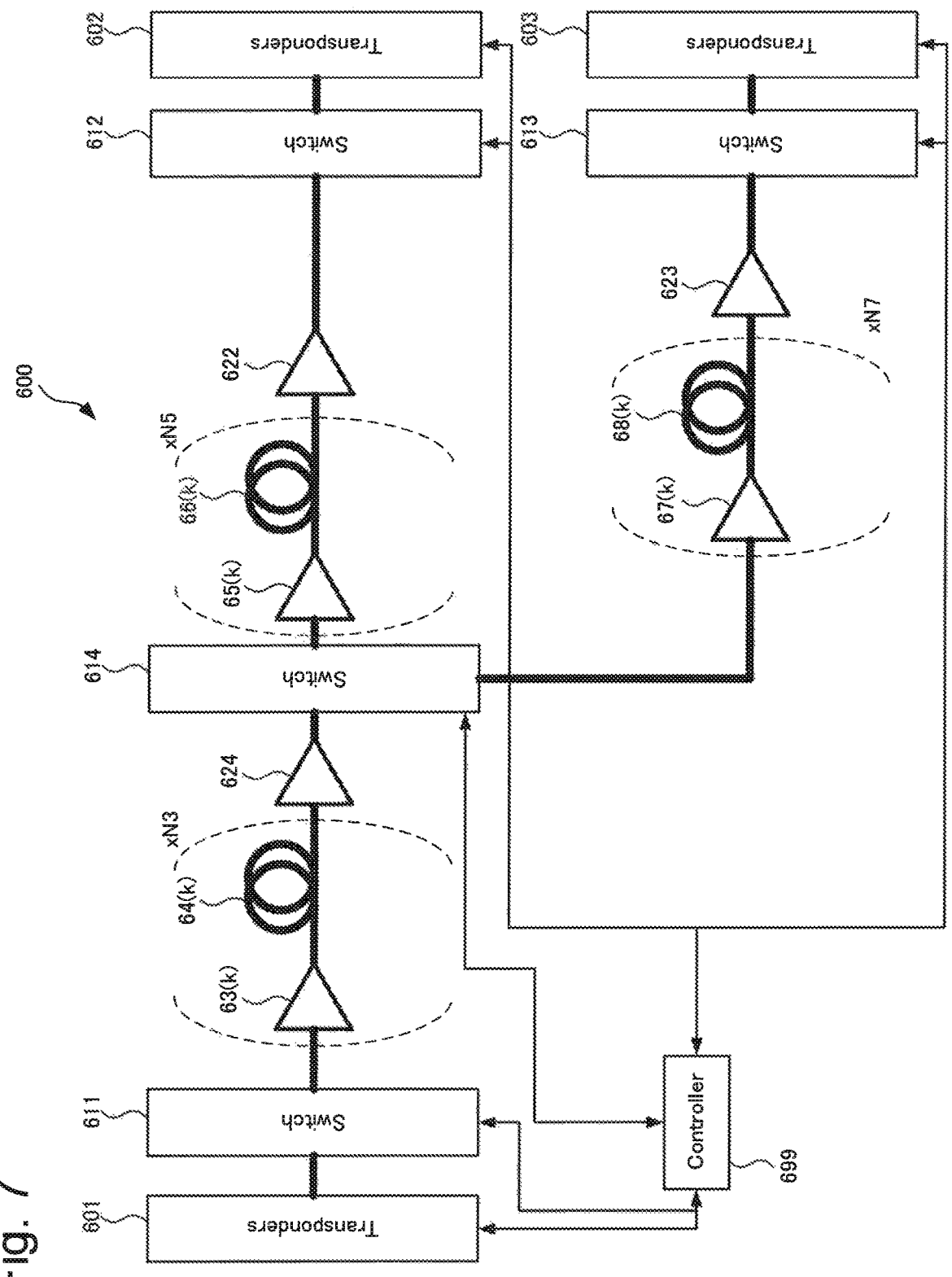
FIG. 7 is a block diagram illustrating the configuration of a network in accordance with a seventh exemplary embodiment of the present invention.

FIG. 7 is a schematic representation of a network 600 in accordance with a seventh exemplary embodiment of the present invention.

Node devices denoted by 601, 602, and 603 include transponders which perform multiplexing in wavelength and space division. Optical switches denoted by 611, 612, 613, and 614 switch optical signals according to the wavelength and the space division.

The transponders included in the node device 601 can be connected to the optical switch 611 by single core fibers. The transponders included in the node device 602 can be connected to the optical switch 612 by single core fibers. The transponders included in the node device 603 can be connected to the optical switch 613 by single core fibers. Alternatively, the transponders can be connected to the switches by MCF.

The optical switch 611 and the optical switch 614 are connected through a transmission line composed of N3-tuple amplifiers 63($k$), fiber spans 64($k$), and an amplifier 624, where k is a numeral between 1 and N3. The optical switch 612 and the optical switch 614 are connected through a transmission line composed of N5-tuple amplifiers 65($k$), fiber spans 66($k$), and an amplifier 622, where k is a numeral between 1 and N5. The optical switch 613 and the optical switch 614 are connected through a transmission line composed of N7-tuple amplifiers 67($k$), fiber spans 68($k$), and an amplifier 623, where k is a numeral between 1 and N7.

The fiber spans of the network can be single core fibers. Alternatively, the fiber spans can be MCF. The amplifiers of the network are SDM amplifiers according to the exemplary embodiments of the present invention. Each of the amplifiers can be similar to the optical amplifier 100 illustrated in FIG. 2. Alternatively, the amplifier can be similar to the optical amplifier 200 illustrated in FIG. 3. Alternatively, the amplifier can be similar to the optical amplifier 300 illustrated in FIG. 4. Alternatively, the amplifier can be similar to the optical amplifier device 400 illustrated in FIG. 5.

A network controller 699 controls the transponders included in the node devices 601, 602, 603 as well as the optical switches 611, 612, 613, and 614. The network controller 699 controls the network elements in order to optimize the power consumption of the amplifiers in the network according to the exemplary embodiments of the present invention. Specifically, the network controller 699 sets the wavelength of the transponders and configures the switches in order to reduce the number of cores of the SDM amplifiers used in the network. This enables to reduce the power consumption of the amplifiers in the network 600.

Figure 8A:
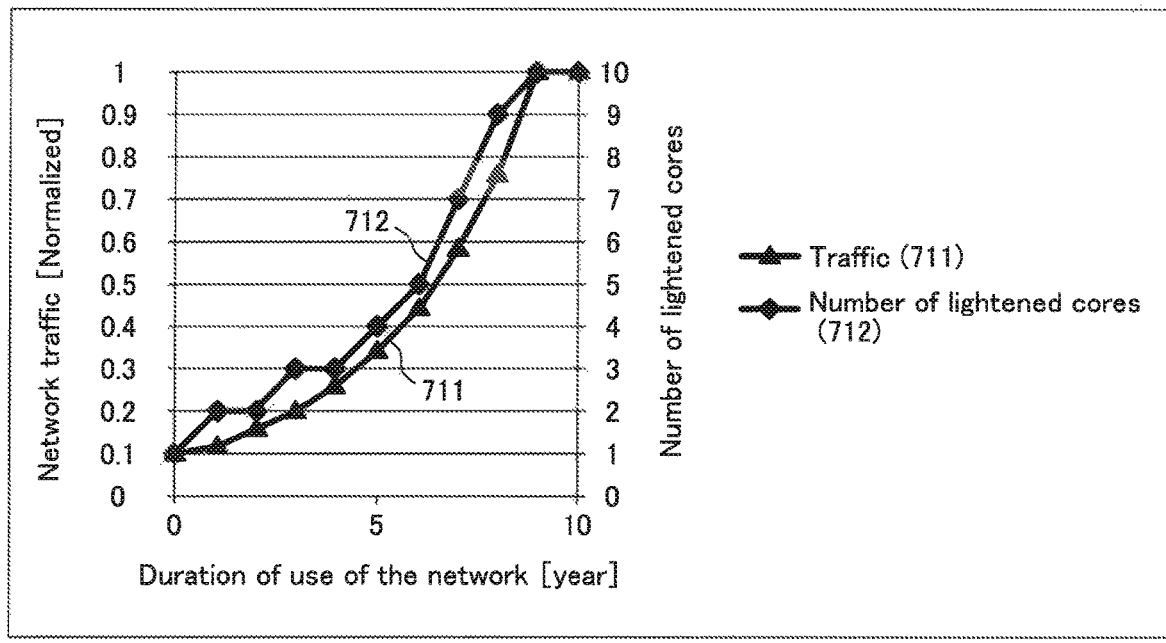
FIG. 8A is a diagram illustrating simulations results of the traffic and the number of in-use fiber cores in the network in accordance with the seventh exemplary embodiment of the present invention.
Figure 8B:
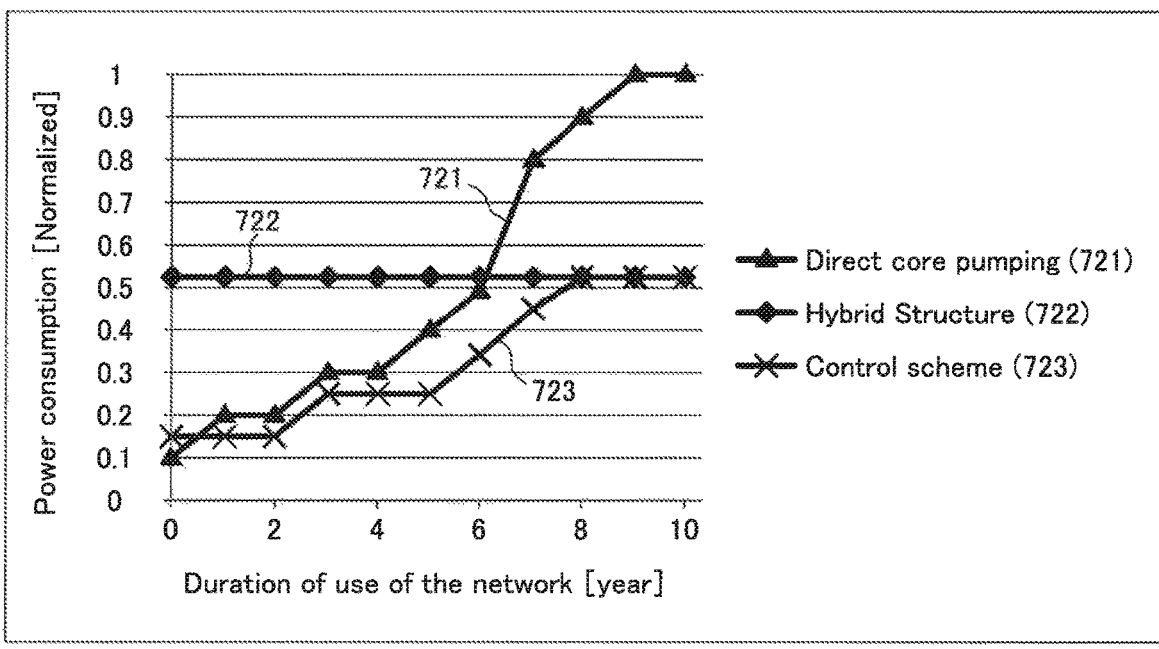
FIG. 8B is a diagram illustrating simulations results of the power consumption of the optical amplifiers in the network in accordance with the seventh exemplary embodiment of the present invention.

FIG. 8A and FIG. 8B illustrate simulations results of the optical network according to the present exemplary embodiment.

FIG. 8A represents the evolution of the traffic and the number of in-use fiber cores in the network 600 illustrated in FIG. 7.

The curve 711 represents the traffic in the network 600 plotted against the duration of use of the network. The duration 0 represents the start of use of the network. The traffic comprehends traffic demands from users and is generated for the network control, provisioning and protection.

The curve 712 represents the number of cores, which are lightened in the SDM amplifiers of the network in order to accommodate the growing traffic of the network. The capacity is steadily growing until year 9, where the full capacity of the network is reached. The number of lightened cores increases accordingly.

FIG. 8B represents the power consumption of the optical amplifiers in the network 600 illustrated in FIG. 7 according to the present exemplary embodiment. Each of the amplifiers in the network 600 is identical with the optical amplifier 200 illustrated in FIG. 3. Specifically, the curve 723 represents the total power consumption of the amplifiers in the network 600 illustrated in FIG. 7 under the conditions represented in FIG. 8A, where the SDM amplifiers are controlled according to the control scheme corresponding to the curve 524 illustrated in FIG. 6B. The curves 721 and 722 are plotted to illustrate the exemplary benefits of the present exemplary embodiment and represent the power consumption under the same conditions for amplifiers as those according to the direct pumping and the hybrid pumping disclosed in PTL1 respectively.

Now, an example of the operation of the network 600 illustrated in FIG. 7 is given. The exemplary benefits of the present exemplary embodiment are denoted with the curve 723 in FIG. 8B.

As the network traffic is growing, more SDM and WDM channels are required to support the required capacity. The network controller 699 controls the wavelengths used by the node devices 601, 602, and 603, as well as the optical switches 611, 612, 613, and 614 in order to minimize the number of in-use SDM channels and therefore cores in the amplifiers in the network 600. Therefore, channels are provided first in the WDM dimension. And then, when all the wavelength channels have become full inside a SDM channel, the network controller 699 starts allocating wavelengths in the next SDM channel.

That is to say, the network controller 699 controls wavelengths and spatial channels used for transmitting the optical channels. And the network controller 699 allocates the wavelengths to a first spatial channel of the spatial channels, and other wavelengths to a second spatial channel of the spatial channels if no wavelength is available in the first spatial channel.

If direct core pump lasers are shared among several cores, the order of the allocated SDM channels is set so that cores sharing the same pump laser are consecutive in the order. According to the curve 524 illustrated in FIG. 6B and the curve 712 illustrated in FIG. 8A, the resulting power consumption is plotted with the curve 723 in FIG. 8B.

Compared to the simple direct core pumping represented by the curve 721, it is possible to reduce the power consumption after half a year according to the present exemplary embodiment. The maximum reduction of the power consumption is 48%. Compared to the hybrid pumping represented by the curve 722, it is possible, according to the present exemplary embodiment, to reduce the power consumption for more than seven years. After a lapse of eight years, the power consumption becomes equal. The maximum reduction of the power consumption is 72% at the introduction of the network in service.

As mentioned above, according to the present exemplary embodiment, it becomes possible to reduce the power consumption effectively, independently of the traffic in the network.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

- 10, 100, 200, 300 optical amplifier
- 20, 182, 282 gain medium
- 30 monitoring unit
- 40 first light source
- 50 second light source
- 60 controller
- 101, 102, 103, 104, 105, 106, 107, 201 to 210, 301 to 30(n) input SDM channel
- 121, 122, 123, 124, 125, 126, 127, 221 to 230, 321 to 32(n) power monitor
- 131, 231, 331 dark core detector
- 132, 232, 332 control circuit
- 140, 240, 340 first pumping laser
- 141, 142, 143, 144, 145, 145, 146, 147, 241, 242, 243, 244, 245, 341 to 34(n) second pumping laser
- 180, 280, 380 power tapping element
- 181, 281, 381 first coupler
- 183, 283 pump stripper
- 184, 284, 384 second coupler
- 185, 285, 385 isolator
- 191, 192, 193, 194, 195, 196, 197, 290 to 299, 391 to 39(n) output SDM channel
- 251, 252, 253, 254, 255 splitter
- 382 first gain medium
- 386 second gain medium
- 400 optical amplifier device
- 421 fan-in
- 422 fan-out
- 430 SDM amplifier
- 401, 402, 403, 404, 405, 406, 407, 408, 409, 410, 481, 482, 483, 484, 485, 486, 487, 488, 489, 490 single core fiber
- 600 network
- 601, 602, 603 node device
- 611, 612, 613, 614 optical switch
- 63(k), 65(k), 67(k), 622, 623, 624 amplifier
- 64(k), 66(k), 68(k) fiber span
- 699 network controller

The invention claimed is:

1. An optical amplifier, comprising:
   a gain medium for amplifying a plurality of optical channels, the gain medium including a plurality of cores through which the plurality of optical channels to propagate respectively and a cladding area surrounding the plurality of cores;
   a monitor configured to monitor the plurality of optical channels inputted into the gain medium and produce a monitoring result;
   a first light source configured to emit a first light beam to excite the cladding area;
   a second light source configured to emit at least one second light beam to excite each of the plurality of cores individually; and
   a controller configured to make a decision as to whether each of the plurality of cores transmits one of the plurality of optical channels based on the monitoring result, and control the first light source and the second light source based on the decision.

2. The optical amplifier according to claim 1, further comprising
   a splitter configured to split each of the at least one second light beam into a plurality of second light beams, each of the plurality of second light beams exciting each of the plurality of cores individually.

3. The optical amplifier according to claim 1,
   wherein the gain medium includes a first gain medium and a second gain medium;
   the first gain medium is configured to be excited by the first light beam; and
   the second gain medium is configured to be excited by the at least one second light beam.

4. The optical amplifier according to claim 1,
   wherein the controller increases optical power of the first light beam if the number of the cores transmitting the optical channel becomes larger than a predetermined number; and
   the controller decreases optical power of the first light beam if the number of the cores transmitting the optical channel becomes smaller than a predetermined number.

5. The optical amplifier according to claim 1,
   wherein the controller increases optical power of the first light beam if optical power of the at least one second light beam decreases; and
   the controller decreases optical power of the first light beam if optical power of the of at least one second light beam increases.

6. The optical amplifier according to claim 1,
   wherein the controller turns off optical power of one of the at least one second light beam if a corresponding core does not transmit the optical channel; and
   the controller turns on optical power of one of the at least one second light beam if a corresponding core transmits the optical channel.

7. The optical amplifier according to claim 1,
   wherein the controller decreases optical power of one of the at least one second light beam if the number of the cores transmitting the optical channel becomes larger than a predetermined number, and a corresponding core transmits the optical channel; and the controller increases optical power of one of the at least one second light beam if the number of the cores transmitting the optical channel becomes smaller than a predetermined number, and a corresponding core transmits the optical channel.

8. The optical amplifier according to claim 1, wherein the controller sets optical power of the first light beam at one of a plurality of preset values; and the controller sets optical power of the at least one second light beam at one of a plurality of preset values.

9. An optical network, comprising:

an optical amplifier; and a network controller, the optical amplifier including a gain medium for amplifying a plurality of optical channels, the gain medium including a plurality of cores through which the plurality of optical channels to propagate respectively and a cladding area surrounding the plurality of cores;

a monitor configured to monitor the plurality of optical channels inputted into the gain medium and produce a monitoring result;

a first light source configured to emit a first light beam to excite the cladding area;

a second light source configured to emit at least one second light beam to excite each of the plurality of cores individually; and a controller configured to make a decision as to whether each of the plurality of cores transmits one of the plurality of optical channels based on the monitoring result, and control the first light source and the second light source based on the decision, wherein the network controller controls wavelengths and spatial channels used for transmitting the optical channels, and the network controller allocates the wavelengths to a first spatial channel of the spatial channels, and other wavelengths to a second spatial channel of the spatial channels if no wavelength is available in the first spatial channel.

10. A method for amplifying an optical signal, comprising:

preparing a gain medium for amplifying a plurality of optical channels, the gain medium including a plurality of cores through which the plurality of optical channels to propagate respectively and a cladding area surrounding the plurality of cores;

monitoring the plurality of optical channels inputted into the gain medium and producing a monitoring result;

generating a first light beam to excite the cladding area;

generating at least one second light beam to excite each of the plurality of cores individually;

making a decision as to whether each of the plurality of cores transmits one of the plurality of optical channels based on the monitoring result; and controlling optical power of the first light beam and the plurality of second light beams based on the decision.

11. The optical amplifier according to claim 2, wherein the gain medium includes a first gain medium and a second gain medium;

the first gain medium is configured to be excited by the first light beam; and the second gain medium is configured to be excited by the of at least one second light beam.

12. The optical amplifier according to claim 2, wherein the controller increases optical power of the first light beam if the number of the cores transmitting the optical channel becomes larger than a predetermined number; and the controller decreases optical power of the first light beam if the number of the cores transmitting the optical channel becomes smaller than a predetermined number.

13. The optical amplifier according to claim 2, wherein the controller increases optical power of the first light beam if optical power of the at least one second light beam decreases; and the controller decreases optical power of the first light beam if optical power of the of at least one second light beam increases.

14. The optical amplifier according to claim 2, wherein the controller turns off optical power of one of the at least one second light beam if a corresponding core does not transmit the optical channel; and the controller turns on optical power of one of the at least one second light beam if a corresponding core transmits the optical channel.

15. The optical amplifier according to claim 2, wherein the controller decreases optical power of one of the at least one second light beam if the number of the cores transmitting the optical channel becomes larger than a predetermined number, and a corresponding core transmits the optical channel; and the controller increases optical power of one of the at least one second light beam if the number of the cores transmitting the optical channel becomes smaller than a predetermined number, and a corresponding core transmits the optical channel.

16. The optical amplifier according to claim 2, wherein the controller sets optical power of the first light beam at one of a plurality of preset values; and the controller sets optical power of the at least one second light beam at one of a plurality of preset values.

17. The optical amplifier according to claim 3, wherein the controller increases optical power of the first light beam if the number of the cores transmitting the optical channel becomes larger than a predetermined number; and the controller decreases optical power of the first light beam if the number of the cores transmitting the optical channel becomes smaller than a predetermined number.

18. The optical amplifier according to claim 3, wherein the controller increases optical power of the first light beam if optical power of the at least one second light beam decreases; and the controller decreases optical power of the first light beam if optical power of the at least one second light beam increases.

19. The optical amplifier according to claim 3, wherein the controller turns off optical power of one of the at least one second light beam if a corresponding core does not transmit the optical channel; and the controller turns on optical power of one of the at least one second light beam if a corresponding core transmits the optical channel.

20. The optical amplifier according to claim 3, wherein the controller decreases optical power of one of the at least one second light beam if the number of the cores transmitting the optical channel becomes larger than a predetermined number, and a corresponding core transmits the optical channel; and the controller increases optical power of one of the at least one second light beam if the number of the cores transmitting the optical channel becomes smaller than a predetermined number, and a corresponding core transmits the optical channel.

\* \* \* \* \*